(12) United States Patent
Miyashita et al.

(10) Patent No.: US 6,798,335 B2
(45) Date of Patent: Sep. 28, 2004

(54) MOBILE TERMINAL DEVICE

(75) Inventors: Yukio Miyashita, Tokyo (JP); Fukiko Maeda, Yokohama (JP); Hidetoshi Yazaki, Yokosuka (JP)

(73) Assignees: NEC Corporation, Tokyo (JP); NTT DoCoMo, Inc., Tokyo (JP)

( * ) Notice: Subject to any disclaimer, the term of this patent is extended or adjusted under 35 U.S.C. 154(b) by 173 days.

(21) Appl. No.: 10/219,575

(22) Filed: Aug. 15, 2002

(65) Prior Publication Data

US 2003/0044090 A1 Mar. 6, 2003

(30) Foreign Application Priority Data

Aug. 28, 2001 (JP) ........................................ 2001-258071

(51) Int. Cl.[7] .................... G05B 19/00; G05B 23/00; G06F 7/00; G06K 9/36; H04Q 1/00
(52) U.S. Cl. ...................... 340/5.53; 455/574; 455/128; 455/343; 340/5.83
(58) Field of Search ........................... 340/5.53, 426.28, 340/545.1; 455/574, 343, 128; 200/50.1–50.14, 50.3

(56) References Cited

U.S. PATENT DOCUMENTS

| | | | | |
|---|---|---|---|---|
| 5,867,802 A | * | 2/1999 | Borza ........................ | 340/5.53 |
| 5,872,834 A | * | 2/1999 | Teitelbaum .............. | 379/93.03 |
| 6,219,793 B1 | * | 4/2001 | Li et al. ..................... | 713/202 |
| 6,374,652 B1 | * | 4/2002 | Hwang ........................ | 70/277 |

* cited by examiner

Primary Examiner—Michael Horabik
Assistant Examiner—Kimberly Hamilton
(74) Attorney, Agent, or Firm—Scully, Scott, Murphy & Presser (57) ABSTRACT

Time elapsed from the time when the sensor cover is opened and power supply to the fingerprint sensor is turned from off to on is counted and when there is no fingerprint image read-in command within a specified period of time power supply to the fingerprint sensor is turned off. Even if power supply to the fingerprint sensor is turned off, when a fingerprint image read-in command executes power supply to the fingerprint sensor is turned on and read-in of a fingerprint image commences. If a fingerprint image read-in command executes when the sensor cover is closed, that command is invalidated. In such a configuration, the opening and closing of a sensor cover works in synchronicity with on/off control of power supply for a fingerprint sensor and even when the sensor cover is open, wasteful electricity consumption through power supply continuing if the fingerprint sensor is not used within a specified period of time is prevented.

3 Claims, 8 Drawing Sheets

Cover in an Open Condition

FIG.6

Cover in a Closed Condition

FIG.7

Cover in an Open Condition open/close detection terminal

| sensor cover | count time elapsing | fingerprint image read-in command | |
|---|---|---|---|
| open | specified time not elapsed | present | ON |
| | | not present | ON |
| | specified time elapsed | present | ON |
| | | not present | OFF |
| closed | | present | OFF |
| | | not present | OFF |

FIG.11

MOBILE TERMINAL DEVICE

BACKGROUND OF THE INVENTION

1. Field of the Invention

The present invention relates to a mobile terminal device installed with a fingerprint sensor, and particularly to battery saving technology for a mobile terminal device.

2. Description of Related Art

In recent years, personal verification has become increasingly important in a variety of applications starting with electronic commercial transactions utilizing a mobile terminal device. Amongst means available for verifying individuals, fingerprint verification is one means with a high possibility of practical implementation in a mobile terminal device due to considerations of the cost of sensors and size.

Among existing fingerprint verification technology there are systems with a personal computer installed utilizing a login function and those used instead of a door key in the entranceway to an apartment building.

The existing technology is confronted by the following problems however. Firstly, a fingerprint sensor of the prior art still consumes considerable power and a mobile terminal device driven by a battery, that has only limited power storage capacity, can only be used for a short time.

Secondly, most fingerprint sensors of the prior art have a sensor cover because they are relatively susceptible to static electricity and do not have a strong surface, but the sensor power supply does not work synchronously with the opening and closing of the sensor cover so that power is supplied even when the sensor cover is closed and electricity consumption continues.

In JP H04-4352 U, it is described technology wherein power supply for a sensor cover and fingerprint input part as well as a fingerprint verification part is synchronized and power supply comes on only when the sensor cover is open, however a problem remains in that when the fingerprint sensor is not used while the sensor cover is open electricity consumption continues Further, basic fingerprint registration and verification methodology for that invention is not described and operations when there is a fingerprint image read-in command before the opening of the sensor cover, that is, prior to commencement of power supply, are not clear.

SUMMARY OF THE INVENTION

The present invention was developed against this background for the objective of providing a mobile terminal device wherein the opening and closing of a sensor cover works in synchronicity with on/off control of power supply for a fingerprint sensor and wherein even when the sensor cover is open, wasteful electricity consumption through power supply continuing if the fingerprint sensor is not used within a specified period of time is prevented. A further object of the present invention is to provide a mobile terminal device wherein, with the sensor cover open, even if power supply to the fingerprint sensor is off, an image can be read-in to the fingerprint sensor when a fingerprint image read-in command executes. Another object of the present invention is to provide a mobile terminal device wherein when a fingerprint image read-in command executes while the sensor cover is closed, that command is invalidated thereby avoiding consumption of battery power.

In the present invention the opening and closing of a sensor cover works in synchronicity with power supply for a fingerprint sensor being turned on or off, and even when the sensor cover is open if the fingerprint sensor is not used wasteful consumption of power is prevented.

That is to say, the present invention operates such that time elapsed from the time when the sensor cover is opened, that is, the time from which power supply to the fingerprint sensor is turned on, is counted, and when there is no fingerprint image read-in command within a specified period of time, power supply to the fingerprint sensor is turned off, so that saving of the battery is achieved because if the fingerprint sensor is not used within a predetermined period of time power supply to the fingerprint sensor is turned off automatically.

Further, the present invention operates such that even if power supply to the fingerprint sensor is turned off, when a fingerprint image read-in command is generated power supply to the fingerprint sensor is turned on enabling read-in of a fingerprint image to commence. That is to say, even while the fingerprint sensor power supply is off monitoring is performed to ascertain the existence or otherwise of a fingerprint image read-in command and the fingerprint sensor power supply can be turned on if that command is present.

Again, the present invention operates such that when a fingerprint image read-in command is generated while the sensor cover is closed, that command is invalidated thereby preventing battery power consumption from the fingerprint sensor power supply going on through an operational error.

That is to say, the present invention is a mobile wireless terminal device comprising a fingerprint sensor for reading in a fingerprint image and a sensor cover covering the fingerprint sensor wherein the sensor cover is manually opened or closed over the fingerprint sensor.

The present invention is characterized by comprising; a detection means for detecting whether or not the sensor cover is open or closed; a first control means that operates in accordance with the result detected by the detection means and turns on power supply to the fingerprint sensor when the sensor cover is in an open condition and turns off power supply to the fingerprint sensor when the sensor cover is in a closed condition; a counting means for counting time elapsed from the point in time at which the sensor cover is detected as being open; a fingerprint image read-in command generating means for generating a fingerprint image read-in command in response to manual operation; a monitoring means for monitoring whether or not that fingerprint image read-in command is generated; a reset/restart means that resets and restarts the count during the counting process if a fingerprint image read-in command is generated while the counting is being performed; and a second control means that turns power supply to the fingerprint sensor off when there is no fingerprint image read-in command within a specified period of time from the commencement of counting by the counting means, even when the sensor cover is in an open condition.

Accordingly, in the present invention the opening and closing of the sensor cover works in synchronicity with power supply for the fingerprint sensor being turned on or off and even when the sensor cover is open, if the fingerprint sensor is not used beyond a specified time, power supply to the fingerprint sensor is turned off thereby avoiding wasteful power consumption.

It is preferable for the present invention to comprise a third control means that turns power supply to the fingerprint sensor on when a fingerprint image read-in command is generated by the fingerprint image read-in command generating means even though power to the fingerprint sensor is off moreover the sensor cover is in an open condition as detected by the second control means.

This means that an image can be read-in to the fingerprint sensor when a fingerprint image read-in command is generated even though the fingerprint sensor power supply is off while the sensor cover is in an open condition.

It is preferable for the present invention to comprise a means to invalidate a fingerprint image read-in command when a fingerprint image read-in command is issued by the fingerprint image read-in command generating means at times when the result detected by the detection means indicates that the sensor cover is closed.

Accordingly, the present invention operates such that when a fingerprint image read-in command executes while the sensor cover is closed, that command is invalidated thereby preventing battery power consumption through an operational error.

BRIEF DESCRIPTION OF THE DRAWINGS

An embodiment of the present invention will now be described using a mobile telephone device as an example of the mobile terminal device of the present invention. A mobile wireless telephone device of this embodiment will now be described with reference to the accompanying of drawings in which.

DETAILED DESCRIPTION OF THE PREFERRED EMBODIMENTS

Figure 1:
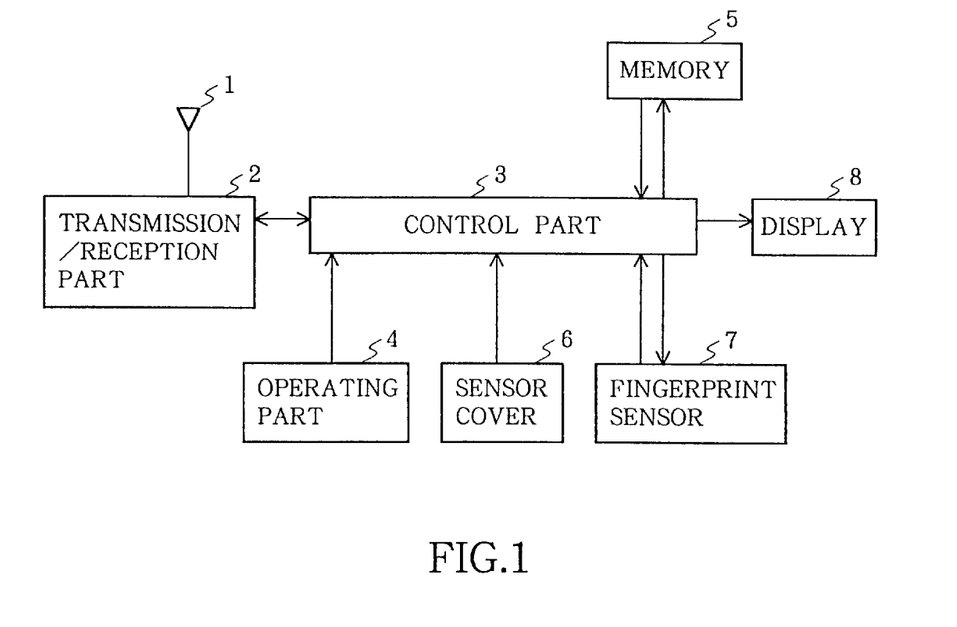
FIG. 1 is a block diagram showing the structure of a mobile telephone device according to the present invention.
Figure 2:
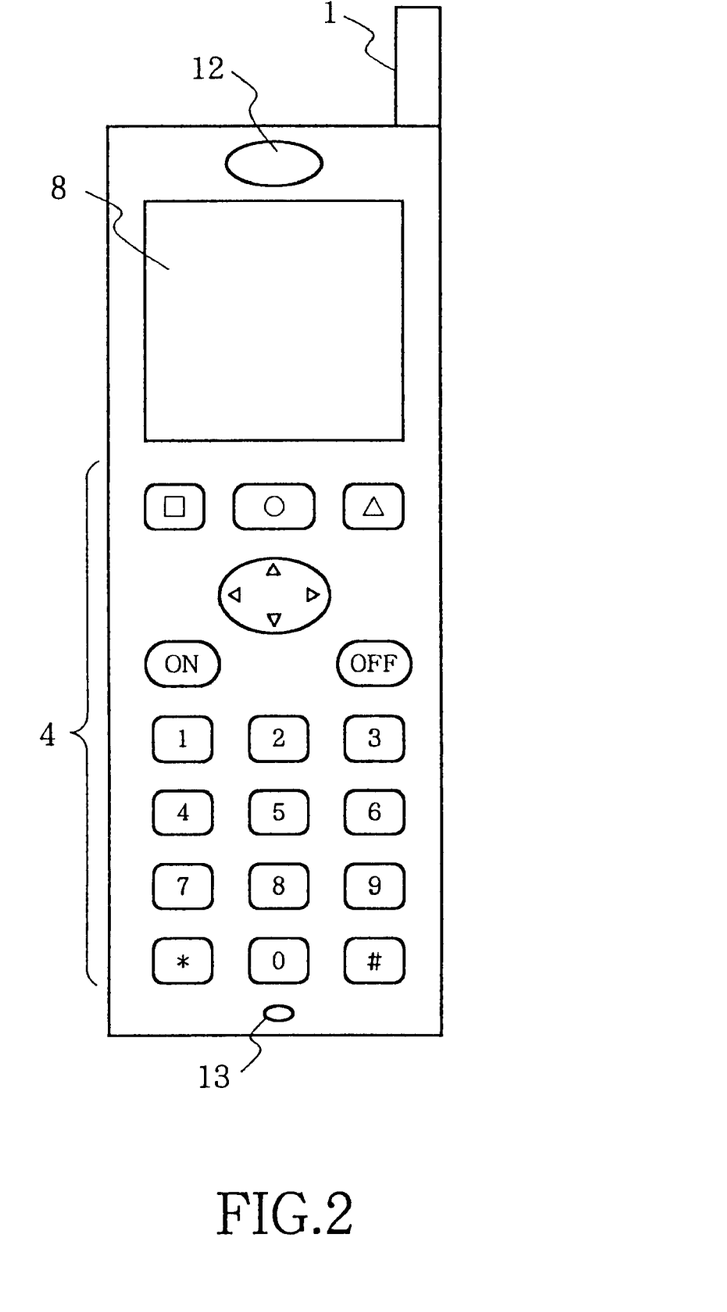
FIG. 2 shows an external view of the front side of a mobile telephone device according to the present invention.
Figure 3:
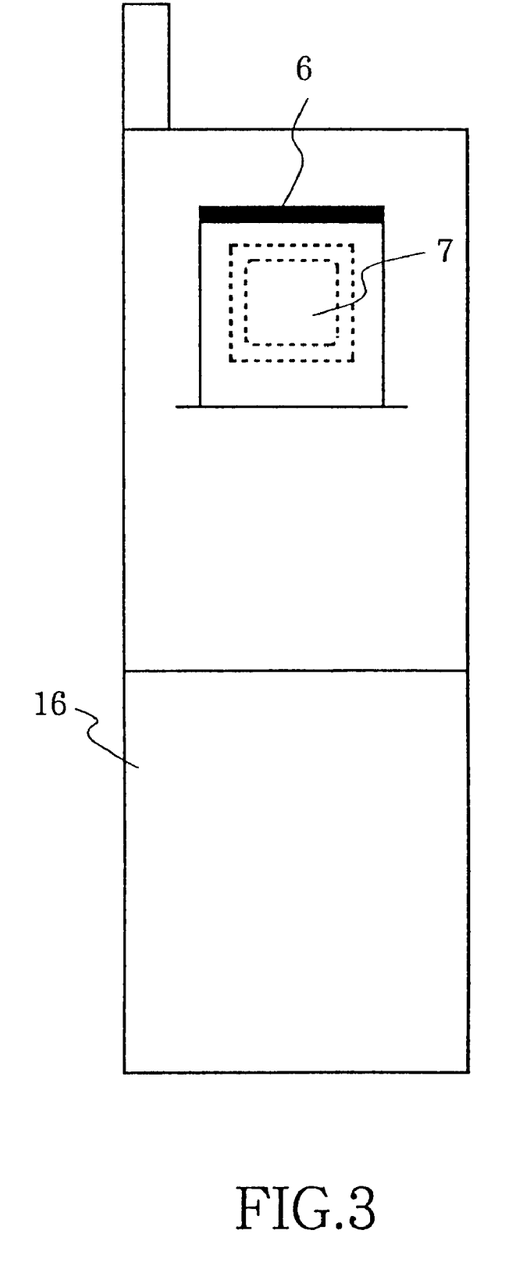
FIG. 3 shows an external view of the rear side of a mobile telephone device and the arrangement of the sensor cover according to the present invention.

As shown in FIGS. 1 through 3, a mobile telephone device of the present embodiment comprises fingerprint sensor 7 for reading in a fingerprint image and sensor cover 6 covering fingerprint sensor 7 wherein sensor cover 6 can be manually opened or closed over fingerprint sensor 7.

In this embodiment, control part 3 performs a first control to detect whether or not sensor cover 6 is open or closed and in accordance with the result so detected turn on power supply to fingerprint sensor 7 when sensor cover 6 is in an open condition and turn off power supply to fingerprint sensor 7 when sensor cover 6 is in a closed condition; and control part 3 performs a second control to count time elapsed from the point in time at which sensor cover 6 becomes open, monitor whether or not a fingerprint image read-in command of fingerprint sensor 7 is generated, reset/restart the count during the counting process if a fingerprint image read-in command is generated while the counting is being performed and in accordance with the result of such monitoring and the result of such counting, turn power supply to fingerprint sensor 7 off when there is no fingerprint image read-in command of fingerprint sensor 7 within a specified period of time from the commencement of counting, even when sensor cover 6 is in a closed condition. A fingerprint image read-in command is generated through manual operation of control part 4.

Control part 3 performs a third control to turn power supply to fingerprint sensor 7 on when a fingerprint image read-in command is generated by control part 4 even though, through operation of the second control of control part 3, power to the fingerprint sensor is off moreover the sensor cover is in an open condition.

Further, a fingerprint image read-in command generated from operating part 4 is invalidated when the detected result of whether sensor cover 6 is in an open or closed condition shows that sensor cover 6 is closed.

This embodiment of the present invention will now be described in more detail.

The configuration will now be described with reference to FIG. 1. Antenna 1 and transmission/reception part 2 are the same kind as are used for an ordinary mobile telephone device. The on/off control function for fingerprint sensor 7 is included within control part 3, which part also includes time counting functionality.

When performing fingerprint registration or verification the person carrying the mobile telephone device (hereinafter the "device holder") operates operating part 4 while viewing the screen of display 8 and by generating a fingerprint image read-in command displays on display 8 a screen requesting input of his fingerprint. Thereafter, as the device holder places their finger in the fingerprint image read-in position of fingerprint sensor 7 a fingerprint image is read-in and the fingerprint information is delivered to control part 3. There is sensor cover 6 on fingerprint sensor 7 however, so the device holder is not able to place his finger on fingerprint sensor 7 without first opening sensor cover 6. Operating part 4 may be operated to generate a fingerprint image read-in command after sensor cover 6 is opened or sensor cover 6 may be opened after operating part 4 is operated to generate a fingerprint image read-in command however in this second case, the command thus generated is invalidated and a screen appears requesting that the operations on display 8 be performed again. Control part 3 monitors to ascertain whether sensor cover 6 is in an open or closed condition.

Control part 3 performs fingerprint registration and verification. When performing registration, the fingerprint information is stored in memory 5 and when performing verification, the fingerprint information stored in memory 5 is compared to the fingerprint information read-in and the result is displayed on display 8.

The outside of a mobile telephone device according to the present invention will now be described with reference to FIGS. 2 and 3. Antenna 1, receiver 12, microphone 13, display 8, operating part 4 and battery 16 are the same as those respective parts in an ordinary mobile telephone device and so no detailed explanation of them is included here. Sensor cover 6 is open or closed by sliding the cover so that when slid in a downward direction fingerprint sensor 7 becomes visible. Usually sensor cover 6 is left closed thereby protecting fingerprint sensor 7. The structure of fingerprint sensor 7 provides a transparent plate on which a finger is placed over sensor elements for reading-in a fingerprint image. The position in which this transparent plate is installed over the mobile telephone terminal is the fingerprint image read-in position. Accordingly, sensor cover 6 is provided to protect this transparent plate from becoming fouled or damaged.

Figure 4:
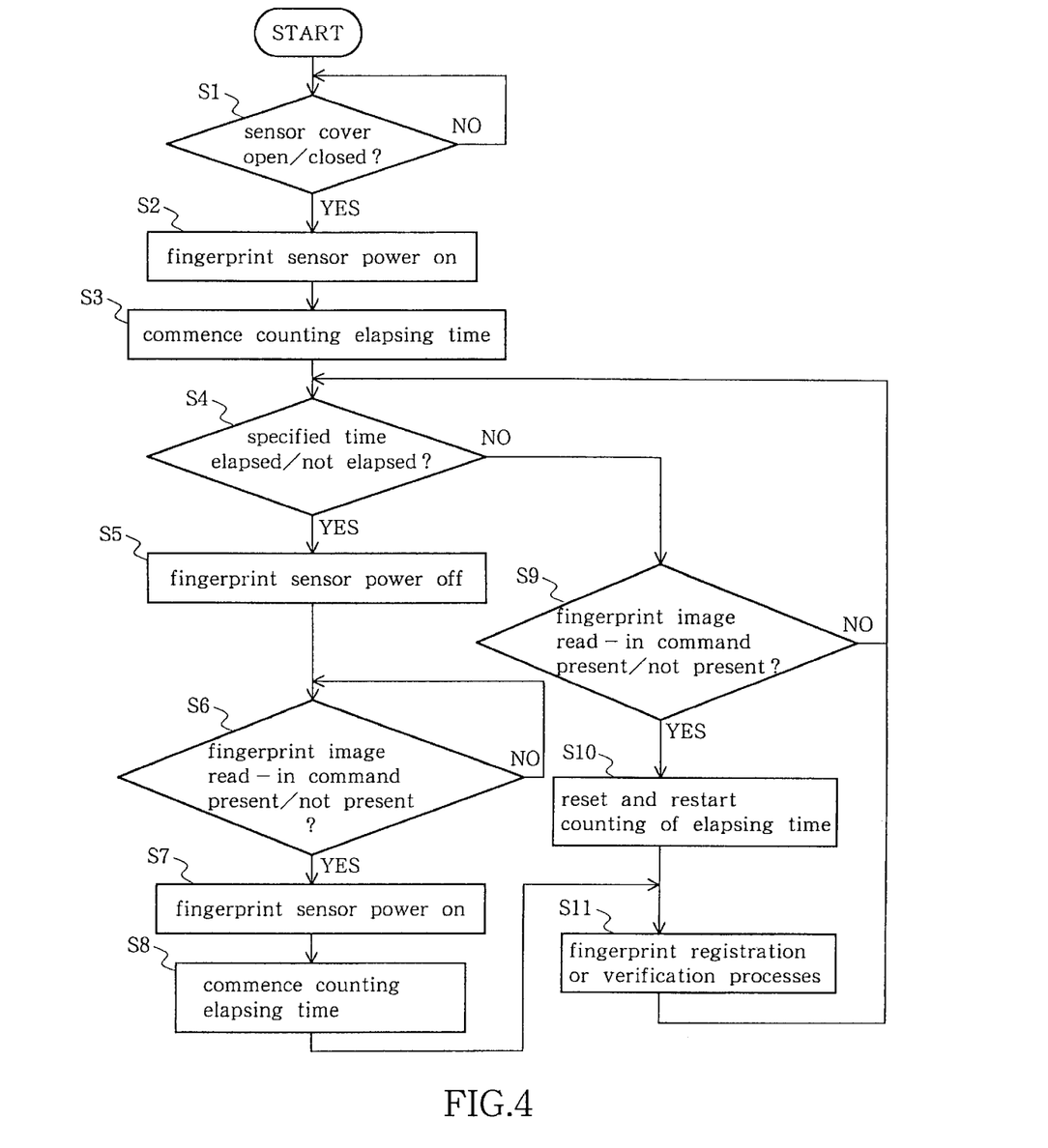
FIG. 4 is a flowchart illustrating procedures for power supply control for a fingerprint sensor according to the present invention.

The flow of power supply control procedures for fingerprint sensor 7 according to this embodiment of the present invention will now be described with reference to FIG. 4. In a mobile telephone device according to the present invention, the condition of sensor cover 6 as either open or closed is continually monitored (S1) and if sensor cover 6 is in a closed condition (NO at S1), monitoring to detect an open or closed condition continues. If sensor cover 6 is detected as being in an open condition (YES at S1), power supply to fingerprint sensor 7 is turned on (S2). At the same time as power supply goes from off to on, control part 3 commences counting time elapsing (S3), until a predetermined amount of time elapses (NO at S4), control part 3 waits to ascertain whether a fingerprint image read-in is executed or not, and if there is no fingerprint image read-in command (NO at S9), control part 3 continues counting time elapsing. If a fingerprint image read-in command is present (YES at S9), the counting of time elapsing is reset and restarted (S10) and fingerprint registration or verification processes are performed (S11). After those processes are completed, control part 3 shifts the control to confirm that the specified amount of time has elapsed (S4). After counting of time elapsing commences and if a predetermined amount of time elapses (YES at S4), power supply to fingerprint sensor 7 is turned off (S5) and control part 3 waits for a fingerprint image read-in command generated through the device holder operating part 4 (NO at S6). If a fingerprint image read-in command is generated (YES at S6), power to fingerprint sensor 7 is turned on (S7) and after counting of time elapsing commences (S8) fingerprint registration or verification processes are performed (S11). Control part 3 then shifts the control to checking time elapsing against the specified amount of time (S4).

The operations of the mobile telephone device of this embodiment will now be described with reference to FIG. 1. Antenna 1 and transmission/reception part 2 are the same as for an ordinary mobile telephone device and transmission and reception are controlled through control part 3.

To register fingerprints the device holder must first open sensor cover 6. At that point, control part 3 recognizes that sensor cover 6 has entered an open condition so in addition to turning power supply to fingerprint sensor 7 from off to on, control part 3 commences counting time elapsing. Next, by operating part 4 to generate a fingerprint read-in command while viewing display 8 the device holder calls up a fingerprint registration screen. In this operation control part 3 determines the content that was entered into operating part 4 and displays that on display 8. Once a message such as "place the finger for registration in position" for example appears on display 8, the device holder then positions his finger on fingerprint sensor 7.

Fingerprint information read-in at fingerprint sensor 7 is delivered to control part 3 where registration processes are implemented before the data is stored in memory 5. The registration processing operations are not relevant to the present invention and are therefore omitted (such things as confirming that the fingerprint image is normal).

Once the fingerprint information is stored or registered in memory 5, a message such as "registration complete. Close sensor cover" is displayed on display 8 and the device holder then closes sensor cover 6. Once sensor cover 6 is closed power supply to fingerprint sensor 7 is turned off, however if the device holder forgets to close sensor cover 6, control part 3 confirms the amount of time that has elapsed and if a predetermined amount of time passes, control part 3 turns power to fingerprint sensor 7 off.

The verification operation matching an input fingerprint to a registered fingerprint will now be explained in brief. Operations up until a fingerprint image read-in is executed are the same as for registration of a fingerprint, so the device holder displays a message such as "place the finger for verification in position" on display 8 through operating part 4 and places his finger on fingerprint sensor 7. The fingerprint information read-in at fingerprint sensor 7 is delivered to control part 3 and verification processes are implemented comparing the fingerprint information thus read-in with fingerprints stored or registered in memory 5. The verification processing operations are not relevant to the present invention and are therefore omitted. Thereafter, control part 3 displays the result of the verification on display 8.

Figure 5:
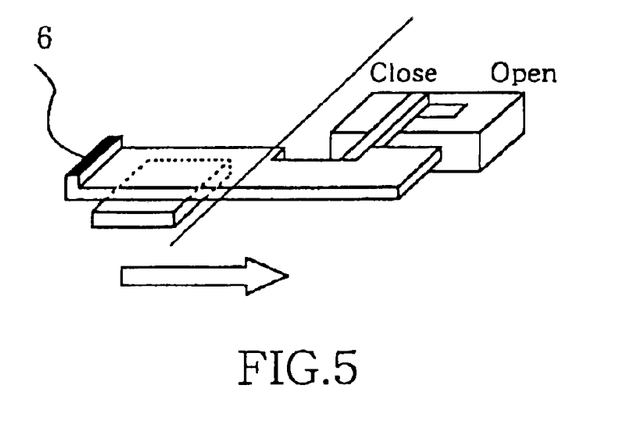
FIG. 5 is a perspective view showing a first example of detection of the sensor cover as open or closed.
Figure 6:
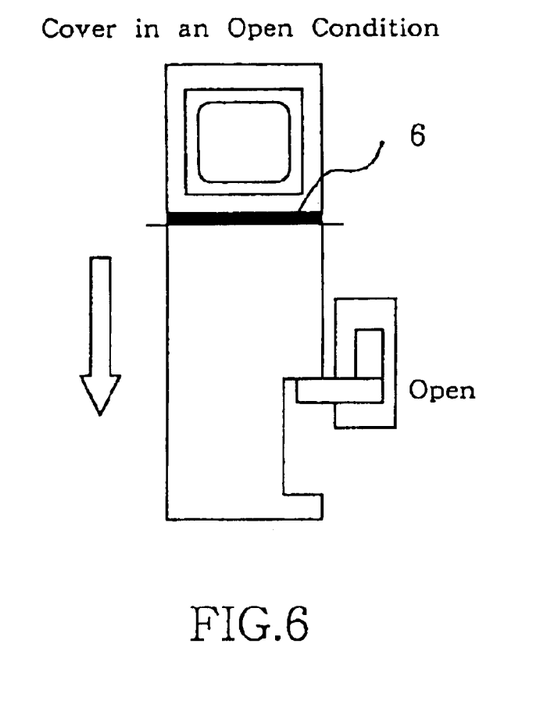
FIG. 6 shows a first example of detection of the sensor cover as open or closed with the cover in an open condition.
Figure 7:
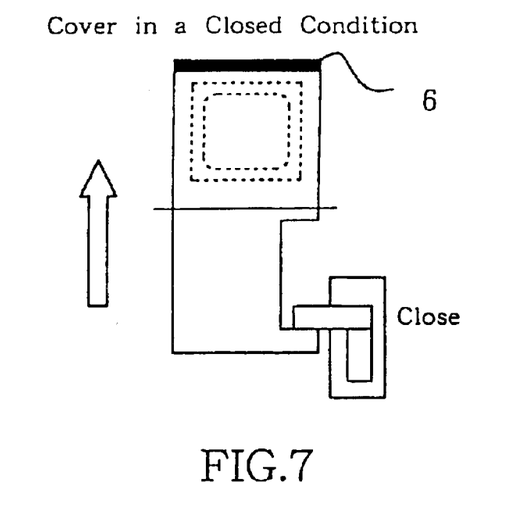
FIG. 7 shows a first example of detection of the sensor cover as open or closed with the cover in a closed condition.

An example of detection of opening and closing of sensor cover 6 of a mobile telephone device according to the present invention will now be described with reference to FIGS. 5 through 10. FIGS. 5 through 7 show an example of utilizing a slide switch for detection of the opening/closing of sensor cover 6, where FIG. 5 shows a perspective view of the configuration. FIGS. 6 and 7 show a frontal view showing the operations of the slide switch when sensor cover 6 is open or closed, illustrating the configuration wherein sensor cover 6 directly works the knob of the slide switch.

Figure 8:
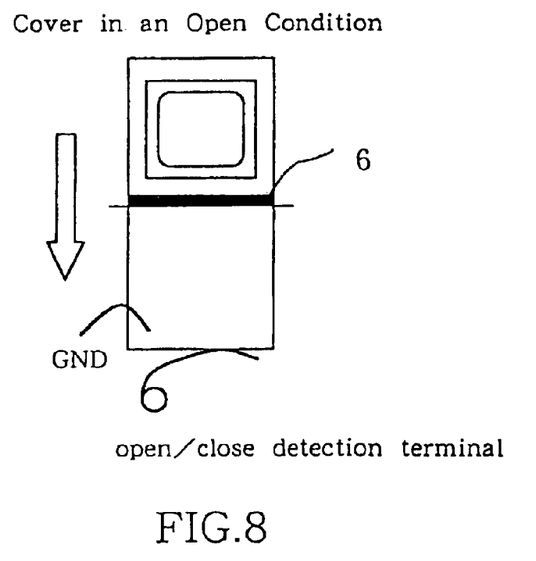
FIG. 8 shows a second example of detection of the sensor cover as open or closed with the cover in an open condition.
Figure 9:
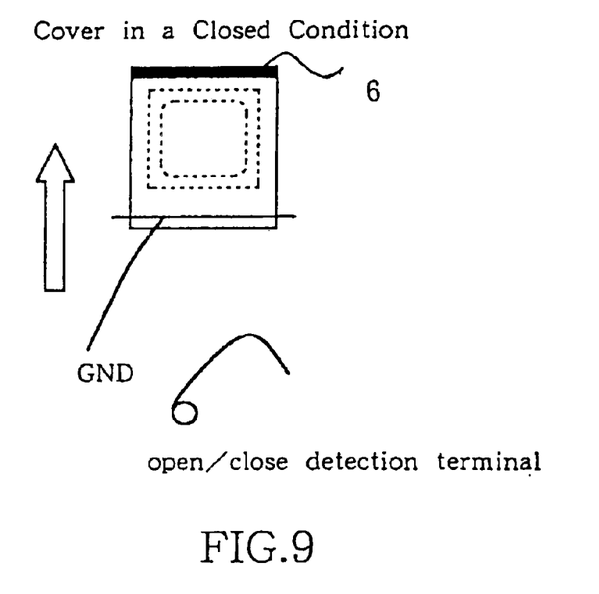
FIG. 9 shows a second example of detection of the sensor cover as open or closed with the cover in a closed condition.
Figure 10:
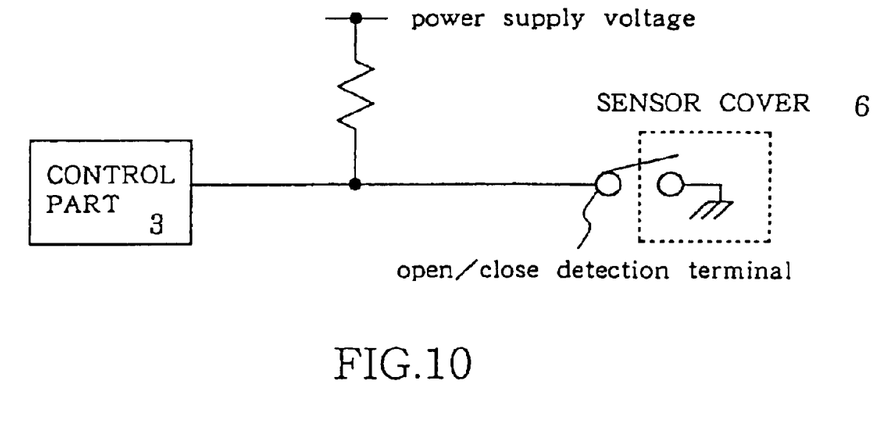
FIG. 10 is a circuit diagram for the second example of detection of the sensor cover as open or closed.

FIGS. 8 through 10 show an example of control part 3 electronically detecting whether sensor cover 6 is open or closed where FIGS. 8 and 9 show a frontal view of the configuration. FIG. 10 is a circuit diagram showing the principles of how the opening or closing of sensor cover 6 is detected wherein if the electric potential of an open/close detection terminal is power supply voltage a "closed condition" is detected and if the electric potential of the open/close detection terminal is ground (GND) potential through contact with sensor cover 6, the cover is detected as being in an "open condition."

Figure 11:
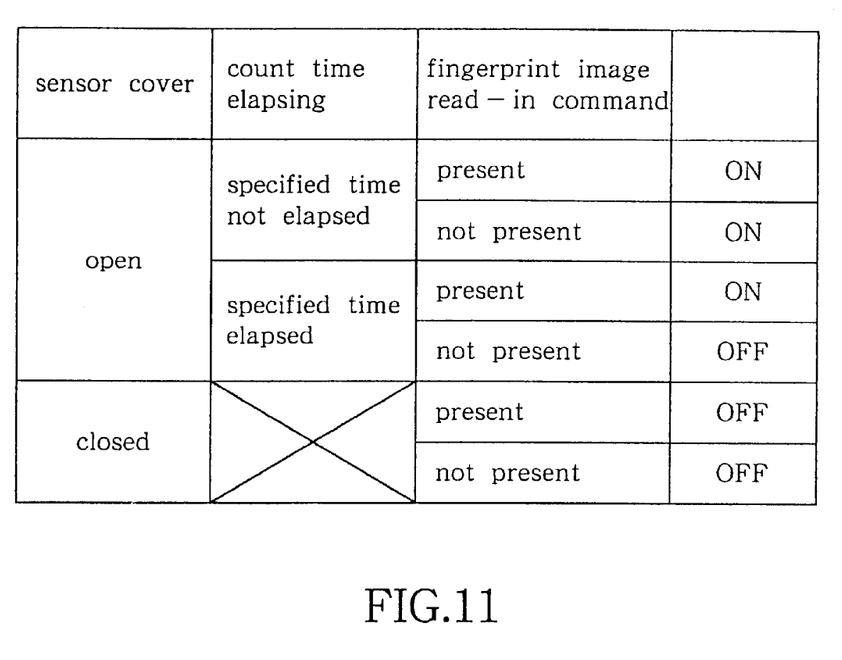
FIG. 11 is a drawing showing control conditions for sensor power supply.

Control conditions for power supply to fingerprint sensor 7 will now be described with reference to FIG. 11. As shown in FIG. 11, there are 3 conditions relevant to controlling power supply to fingerprint sensor 7, that is, "sensor cover open/closed", "specified time elapsed/not elapsed" and "fingerprint image read-in command present/not present". If the first condition "sensor cover open/closed" is "closed", power supply to fingerprint sensor 7 is off without reference to the other two conditions. If the condition "sensor cover open/closed" is "open", the next condition "specified time elapsed/not elapsed" is checked. If the result is "specified time not elapsed", power supply to fingerprint sensor 7 is on without reference to the next condition "fingerprint image read-in command present/not present". Finally, if the second condition "specified time elapsed/not elapsed" is "specified time elapsed", the final condition "fingerprint image read-in command present/not present" is checked. If the result is "present", power supply is on, while, if the result is "not present", power supply is off.

As described, in the present invention the opening and closing of a sensor cover works in synchronicity with on/off control of power supply for the fingerprint sensor and even when the sensor cover is open, wasteful electricity consumption through power supply continuing even if the fingerprint sensor is not used within a specified period of time can be prevented. Further, in the present invention, with the sensor cover open, even if power supply to the fingerprint sensor is off, an image can be read-in to the fingerprint sensor when a fingerprint image read-in command executes. Also, with the present invention when a fingerprint image read-in command executes while the sensor cover is closed, that command is invalidated thereby avoiding consumption of battery power through an operational error.

What is claimed is:

1. A mobile terminal device comprising a fingerprint sensor for reading in a fingerprint image and a sensor cover covering the fingerprint sensor wherein the sensor cover is manually opened or closed over the fingerprint sensor, which is characterized by comprising;

a detection means for detecting whether or not the sensor cover is open or closed;

a first control means that operates in accordance with the result detected by the detection means and turns on power supply to the fingerprint sensor when the sensor cover is in an open condition and turns off power supply to the fingerprint sensor when the sensor cover is in a closed condition;

a counting means for counting time elapsed from the point in time at which the sensor cover is detected as being open;

a fingerprint image read-in command generating means for generating a fingerprint image read-in command in response to manual operation;

a monitoring means for monitoring whether or not a fingerprint image read-in command is generated;

a reset/restart means that resets and restarts the count during the counting process if a fingerprint image read-in command is generated while the counting is being performed; and a second control means that turns power supply to the fingerprint sensor off when there is no fingerprint image read-in command within a specified period of time from the commencement of counting by the counting means, even when the sensor cover is in an open condition.

2. A mobile terminal device as claimed in claim 1, which further comprises a third control means that turns power supply to the fingerprint sensor on when a fingerprint image read-in command is generated by the fingerprint image read-in command generating means even though power to the fingerprint sensor is off moreover the sensor cover is in an open condition as detected by the second control means.

3. A mobile terminal device as claimed in claim 2, which further comprises a means to invalidate a fingerprint image read-in command when a fingerprint image read-in command is generated by the fingerprint image read-in command generating means at times when the result detected by the detection means indicates that the sensor cover is closed.

* * * * *